(12) United States Patent
Terasaki et al.

(10) Patent No.: US 6,243,354 B1
(45) Date of Patent: *Jun. 5, 2001

(54) OPTICAL DISK HAVING HIGH RECORDING DENSITY

(75) Inventors: Hitoshi Terasaki, Gifu; Shuichi Ichiura, Hashima, both of (JP)

(73) Assignee: Sanyo Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,031

(22) Filed: Apr. 22, 1998

(30) Foreign Application Priority Data

Apr. 24, 1997 (JP) .................................................. 9-107895

(51) Int. Cl.$^7$ ....................................................... G11B 7/00
(52) U.S. Cl. ........................................................ 369/275.4
(58) Field of Search ............................ 369/54, 58, 275.3, 369/275.4, 272, 275.1

(56) References Cited

U.S. PATENT DOCUMENTS 6,009,072 * 12/1999 Tsuchiya et al. ............. 369/275.3 X

* cited by examiner

*Primary Examiner*—Paul W. Huber
(74) *Attorney, Agent, or Firm*—Armstrong, Westerman, Hattori, McLeland & Naughton, LLP

(57) ABSTRACT

An optical disk includes a track having a track pitch that is k times (0<k<1) the track pitch of a compact disk format. The track is formed by a pit having a pit length shorter than k times the pit length of the compact disk format. The track pitch P$\mu$m and shortest pit length L$\mu$m are set to satisfy the relationship of L<(A/1.6)×P where A=(V/4.3218)×3 when a standard compact disk having linear velocity of V m/second is compressed. When the recording density is to be increased to two times that of the compact disk, the track pitch is set to approximately 0.9–1.4 $\mu$m, more preferably approximately 1.1–1.3 $\mu$m, and further preferably to approximately 1.2 $\mu$m. Since the track pitch is not compressed as much as the pit length in this optical disk, generation of crosstalk can be suppressed. Also, jitter in a reproduced signal can be suppressed since the track pitch is set to 1.2 $\mu$m or in the vicinity thereof.

3 Claims, 5 Drawing Sheets

OPTICAL DISK HAVING HIGH RECORDING DENSITY

BACKGROUND OF THE INVENTION

1. Field of the Invention

The present invention relates to optical disks having high recording density, and more particularly, to an optical disk such as a compact disk and a video disk that allows recording/reproduction for a long period of time.

2. Description of the Background Art

Various optical disks such as a compact disk (CD) and a video disk are developed. There are various standards such as CD-DA, CD-ROM, and CD-I even in one type of a compact disk. According to these standards, the physical dimensions such as disk outer diameter, track pitch, and minimum size of pit (shortest pit length) are predetermined.

For example, in a CD-ROM, the track pitch is 1.6 $\mu$m and the shortest pit length is 0.83–0.97 $\mu$m. The shortest pit length varies according to the allowance of the linear velocity (1.2–1.4 m/sec) of the optical disk. More specifically, since the frequency of a reproduction clock is 4.3218 MHz, the physical length of 3T which is the shortest pit length is 0.83 ($\approx$(1.2/4.3218)×3) $\mu$m when the linear velocity is, for example, 1.2 m/second.

In accordance with the technical advance in the field of short-wavelength laser, various research is carried out as to disk fabrication outside the standard range and reproduction thereof. For example, the technique of recording information at a track pitch smaller than that of the standard to store information approximately two times the standard capacity into an optical disk of an outer diameter identical to that of the standard is known. In this case, reproduction from such an optical disk of high density recording can be effected by reducing the diameter of the beam spot employed in reproduction.

One method of increasing the recording density of an optical disk is to compress the physical amount such as the track pitch and the pit length. For example, a double recording density can be achieved by setting the track pitch and the pit length to $1/\sqrt{2}$ respectively.

However, crosstalk occurs between adjacent tracks at the time of reproduction if the track pitch is too small. Furthermore, if the pit length is reduced, the level of a reproduced signal becomes smaller as the pit has a length more approximating to the shortest pit length. Although the level of the reproduced signal can be easily compensated for, it is difficult to remove the crosstalk component from the reproduced signal.

If the recording density is improved on physical basis as described above, the standard deviation of the jitter of the reproduced signal is increased at the time of reproduction. The frequency of readout error becomes higher as this standard deviation is greater.

SUMMARY OF THE INVENTION

In view of the foregoing, an object of the present invention is to suppress generation of crosstalk in an optical disk.

Another object of the present invention is to suppress jitter from a reproduced signal in an optical disk.

According to an aspect of the present invention, an optical disk includes a track having a track pitch of k times the track pitch of a standard recording format. Here, 0<k<1. The track is formed of a pit having a pit length smaller than k times the pit length of the standard recording format. The standard recording format is preferably a compact disk format.

When a standard compact disk having linear velocity of V m/second is compressed, the track pitch Pgm and the shortest pit length L$\mu$m preferably satisfy the relationship of L<(A/1.6)×P. Here, A=(V/4.3218)×3. Further preferably, the optical disk has a recording density approximately two times the recording density of the standard recording format, and the above track pitch is approximately 1.2 $\mu$m.

Preferably, the optical disk has a recording density n times the recording density of the standard recording format, where n>1. The track pitch is greater than 1.6/$\sqrt{n}$ $\mu$m.

Although the above-described optical disk is reduced in track pitch and pit length to increase the recording density, generation of crosstalk between adjacent tracks is suppressed since the track pitch is not reduced as much as the pit length.

According to another aspect of the present invention, an optical disk has a recording density approximately two times the recording density by a compact disk format, and includes a track having a track pitch of approximately 0.9–1.4 $\mu$m. When the wavelength of the laser beam used in reproduction is approximately 780 $\mu$m and the numerical aperture of the objective lens used in reproduction is approximately 0.52, the track pitch is preferably approximately 1.1–1.3 $\mu$m.

The above-described optical disk has a reproduced signal suppressed in jitter to reduce generation of readout error since the track pitch is set to approximately 0.9–1.4 $\mu$m, preferably approximately 1.11–1.3 $\mu$m to increase the recording density.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An embodiment of the present invention will be described in detail hereinafter with reference to the drawings.

Figure 1:
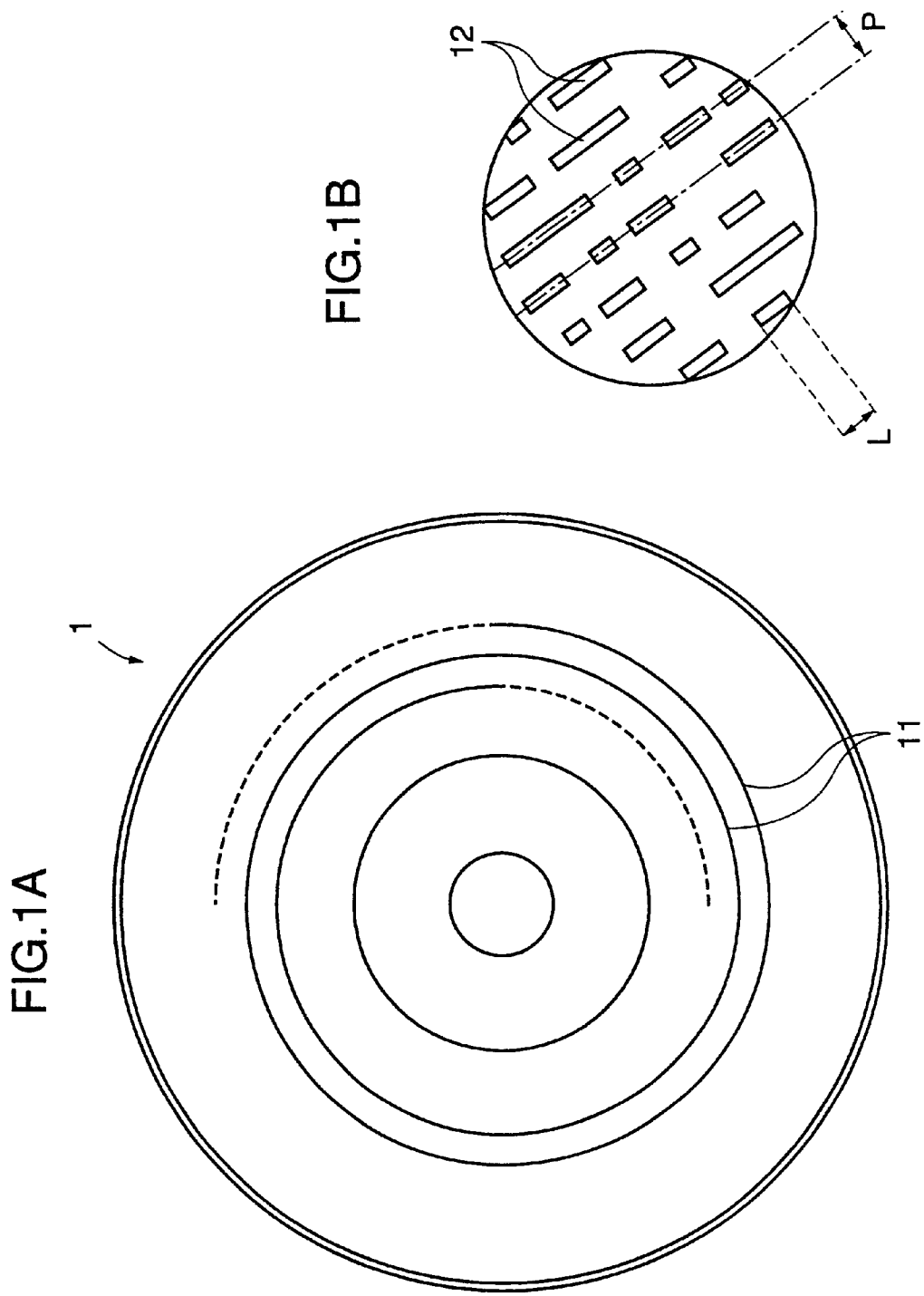
FIG. 1A is a plan view of an optical disk according to an embodiment of the present invention.
FIG. 1B is an enlargement of a track on the optical disk of FIG. 1A.

Referring to FIG. 1A, a CD-ROM 1 includes a track 11 formed in a spiral manner. Track 11 is formed by a row of a plurality of pits 12 as shown in FIG. 1B. Track pitch P is set k times (0<k<1) the track pitch of the compact disk format (1.6 $\mu$m) of the standard format. Pit length L is set shorter than k times the pit length of the compact disk format. Although track 11 is formed in a spiral manner here, track pitch 11 may be formed concentrically.

Figure 2:
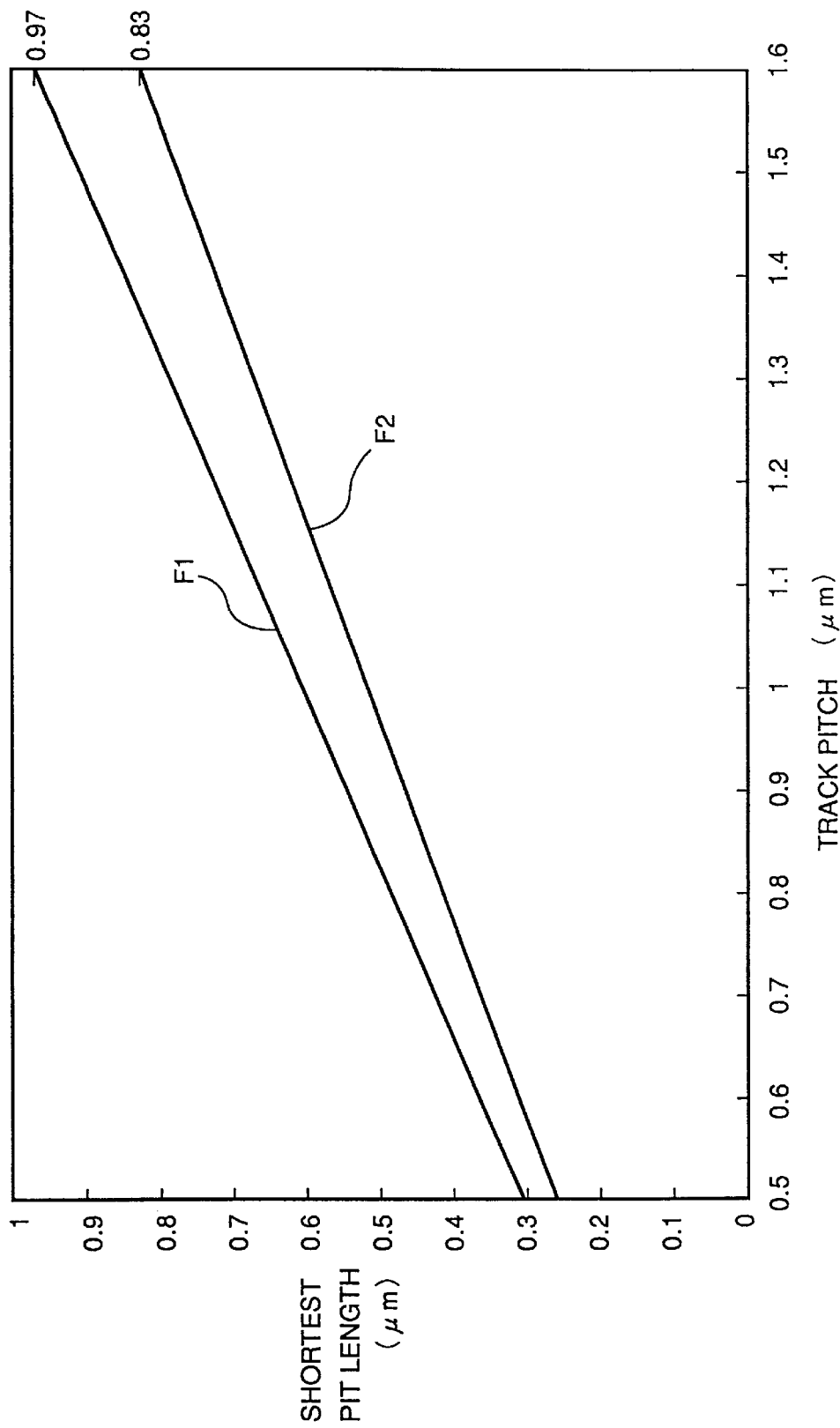
FIG. 2 is a graph showing the relationship between track pitch and shortest pit length in the event of increasing the recording density of an optical disk by a compact disk format.

Referring to FIG. 2, a method of determining a recording format to increase the recording density of a CD-ROM will be described. According to a standard compact disk format, the track pitch is 1.6 μm, and the shortest pit length is 0.97 μm for a linear velocity of 1.4 m/second and 0.83 μm for a linear velocity of 1.2 m/second. Here, the shortest pit length corresponds to the length of 3T when the pit length generating the unitary pulse of a reproduction clock is 1T. Although the shortest pit length is reduced as will be described afterwards according to increase in the density, the pulse length of a reproduced signal will be identical to that reproduced from a CD-ROM currently available on the market by reducing the rotary velocity of CD-ROM 1 at the time of reproduction.

In FIG. 2, line F1 shows the relationship when both the track pitch and the shortest pit length are compressed uniformly for a CD-ROM having a linear velocity of 1.4 m/second. In a CD-ROM currently available on the market that is not compressed, the track pitch is 1.6 μm and the shortest pit length thereat is 0.97 μm. In the event of compressing both the track pitch and the shortest pit length uniformly, the shortest pit length is reduced as the track pitch becomes smaller from 1.6 μm. For example, in order to double the recording density, the track pitch can be set to 1.13 μm which is $1/\sqrt{2}$ times 1.6 μm, and the shortest pit length can be set to 0.69 μm which is $1/\sqrt{2}$ times 0.97 μm.

In FIG. 2, line F2 indicates the relationship when both the track pitch and the shortest pit length are compressed uniformly for a CD-ROM having a linear velocity of 1.2 m/second. In an CD-ROM currently available on the market that is not compressed, the track pitch is 1.6 μm and the shortest pit length thereat is 0.83 μm.

When the track pitch and the shortest pit length are both compressed uniformly for a CD-ROM having a linear velocity in the tolerable range of 1.2–1.4 m/second, the relationship between the track pitch and the shortest pit length is represented by an arbitrary line between lines F1 and F2 of FIG. 2.

In order to reduce crosstalk in the reproduced signal, it is desirable to achieve higher density by setting the compression ratio of the pit length greater than the compression ratio of the track pitch. More specifically, when the recording density of a CD-ROM having a linear velocity of 1.4 m/second is to be increased, the track pitch and the shortest pit length are set at a region below line F1 in FIG. 2. For example, when the recording density is to be doubled, the shortest pit length is set to 0.69 μm which is $1/\sqrt{2}$ times 0.97 μm, and the track pitch is set to 1.16 μm which is $1/\sqrt{1.9}$ times 1.6 μm. In this case, the recording density is 1.95($\approx\sqrt{2}\times\sqrt{1.9}$) times in the strictest sense.

When the recording density of a CD-ROM having a linear velocity of 1.2 m/second is to be increased, the track pitch and the shortest pit length are set at the region below line F2.

In the case of increasing the recording density of a standard compact disk format having a frequency of 4.3218 MHz for a reproduction clock, the shortest pit length Lμm and track pitch Pμm are set to satisfy the following relationship when a standard compact disk having linear velocity of V m/second is compressed.

$$L < (A/1.6) \times P$$

$$A = (V/4.3218) \times 3$$

When the recording density is increased to n (n>1) times, the track pitch is set greater than $1.6/\sqrt{n}$ μm.

Although the shortest pit length of 3T was taken as an example for facilitating the understanding of the compression of a pit length, other pit lengths such as 4T and 5T can be employed by compressing the same at a ratio identical to that of the shortest pit length.

Figure 3:
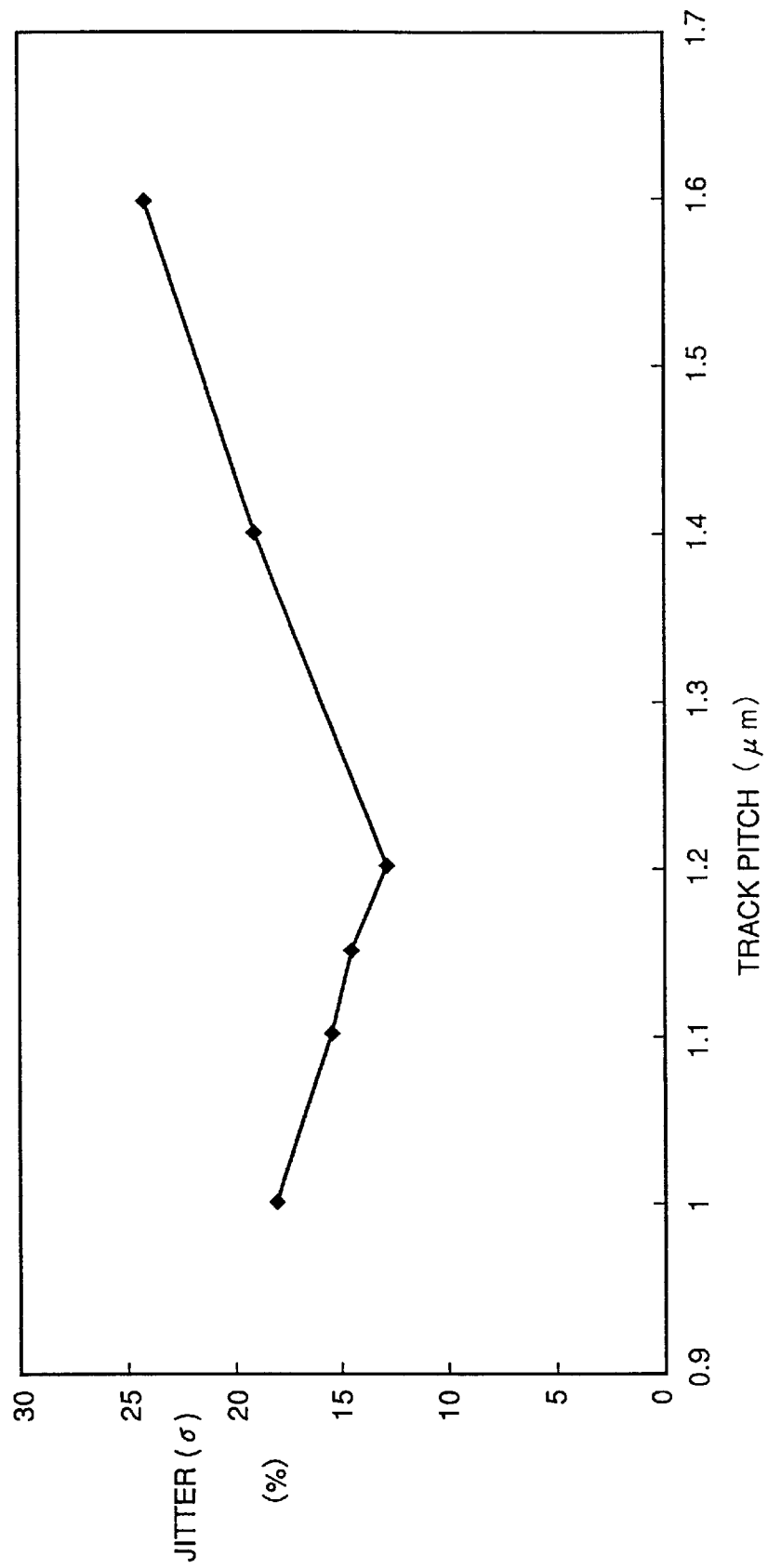
FIG. 3 is a graph showing the relationship between track pitch and jitter in the event of increasing the recording density of an optical disk by a compact disk format.

Jitter in a reproduced signal will be described hereinafter. The relationship between jitter and track pitch was as shown in FIG. 3 as a result of measuring the standard deviation of jitter in a reproduced signal from a CD-ROM compressed to have a doubled recording density.

The measurement was carried out using a semiconductor laser having a wavelength of 780 nm and an objective lens having a numerical aperture of 0.52. It is appreciated from FIG. 3 that the standard deviation of jitter can be most suppressed by setting the track pitch in the vicinity of 1.2 μm.

The jitter standard deviation is preferably reduced to approximately 15% to suppress generation of readout error. Therefore, the track pitch is preferably set to approximately 1.1–1.3 μm as apparent from FIG. 3.

For a CD-ROM having a linear velocity of 1.2 m/second with the track pitch set to the optimum value of 1.2 μm, a recording density that is 1.91 times that of the currently available CD-ROM can be achieved when the shortest pit length (3T) is 0.53 μm. When the same recording density is to be achieved with the track pitch set to 1.1–1.3 μm so that the jitter is within the above tolerable range, the shortest pit length must be set to 0.54–0.63 μm.

In achieving a recording density increased to 1.91 times, the track pitch is 1.16 (=$1.6/\sqrt{1.91}$)μm if the method of compressing both the track pitch and pit length uniformly is employed. Therefore, in the range where the track pitch is 1.1–1.6 μm of the jitter tolerable range, the compression ratio of the track pitch will become greater than the compression ratio of the pit length to result in increase in crosstalk. However, the jitter can be suppressed sufficiently.

In the above-described embodiment, measurement was carried out using a semiconductor laser having a wavelength of 780 nm and an objective lens having a numerical aperture of 0.52. Since the spot diameter of a laser beam can be made smaller by reducing the wavelength to, for example, 680 nm or 635 nm, it is easily understood that the minimum point of the standard deviation of the jitter can be shifted leftwards and downwards in FIG. 3. Therefore, the optimum track pitch will become smaller than 1.2 μm. Also, the tolerable range of the standard deviation of the jitter of less than 15% will particularly spread in the direction of a smaller track pitch. Therefore, the track pitch is preferably set to approximately 0.9–1.4 μm taking into consideration the wavelength of various available laser beams, the numerical aperture of the objective lens, and the like.

Figure 4:
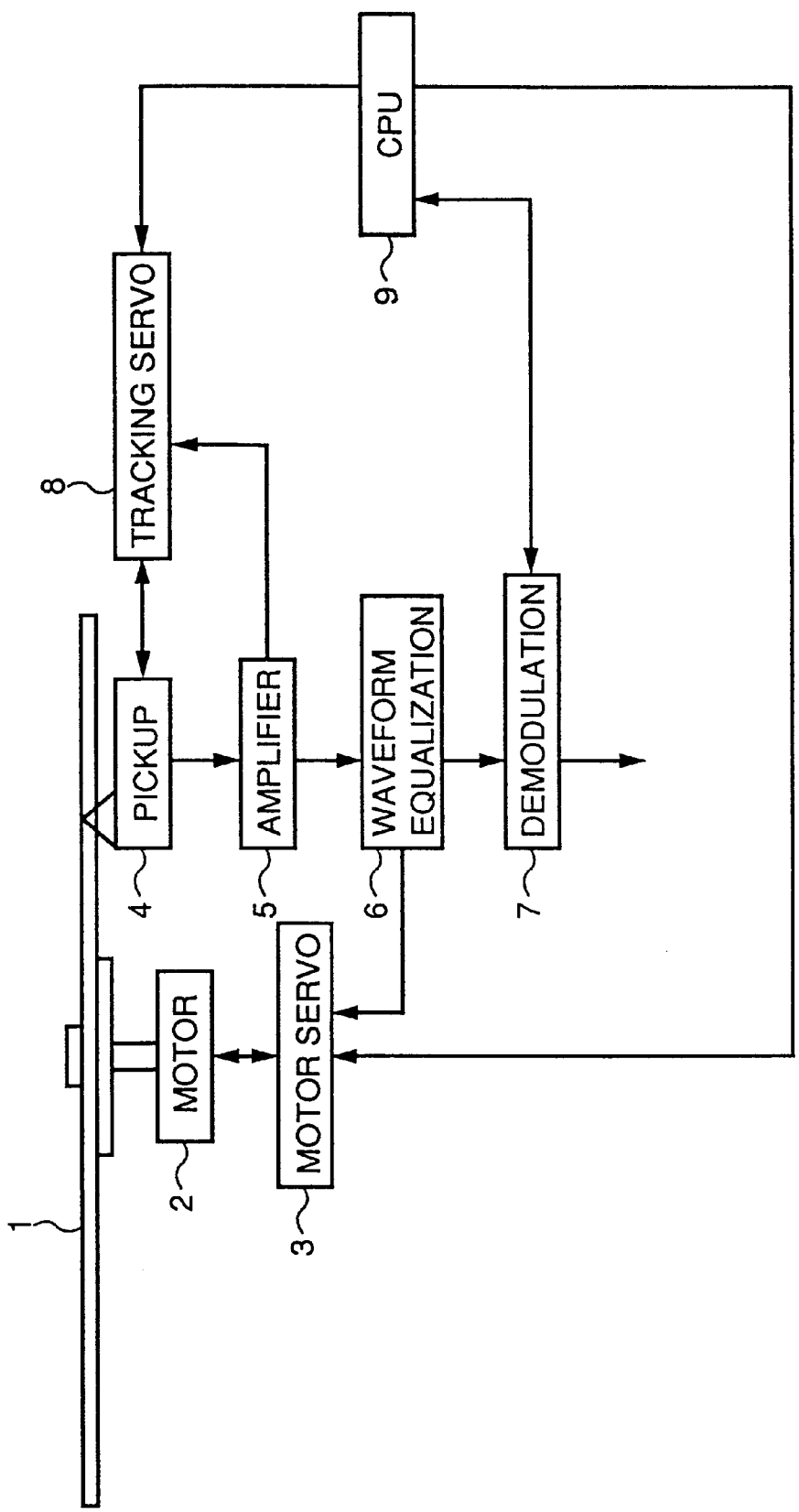
FIG. 4 is a block diagram showing a structure of a reproduction apparatus for the optical disk of FIG. 1A.

Referring to FIG. 4, a reproduction apparatus for the above-described CD-ROM 1 includes a spindle motor 2, a motor servo circuit 3, an optical pickup 4, an amplifier 5, a waveform equalization circuit 6, a demodulation circuit 7, a tracking servo circuit 8, and a CPU for control.

Spindle motor 2 drives a turntable that holds CD-ROM 1. Motor servo circuit 3 provides control of spindle motor 2 according to the signals from waveform equalization circuit 6 and CPU 9. Optical pickup 4 scans the track on a rotating CD-ROM 1 with a laser beam. Amplifier 5 amplifies various signals such as a reproduced signal, a focus error signal, a tracking error signal, and the like from pickup 4. Waveform equalization circuit 6 equalizes the waveform of a signal from amplifier 5. Demodulation circuit 7 demodulates the signal having the waveform equalized. The data signal from demodulation circuit 7 is supplied to a reproduction process system that is not shown. Tracking servo circuit 8 positions a laser beam at a desired track on CD-ROM 1 by providing control of optical pickup 4 and the objective lens therein.

CPU 9 for control receives a signal from demodulation circuit 7 to provide control of motor servo circuit 3 and tracking servo circuit 8 according to the increase of the density. Motor servo circuit 3 receives a clock signal from waveform equalization circuit 6 to provide control of spindle motor 2 so that the clock signal attains a predetermined cycle.

Figure 5:
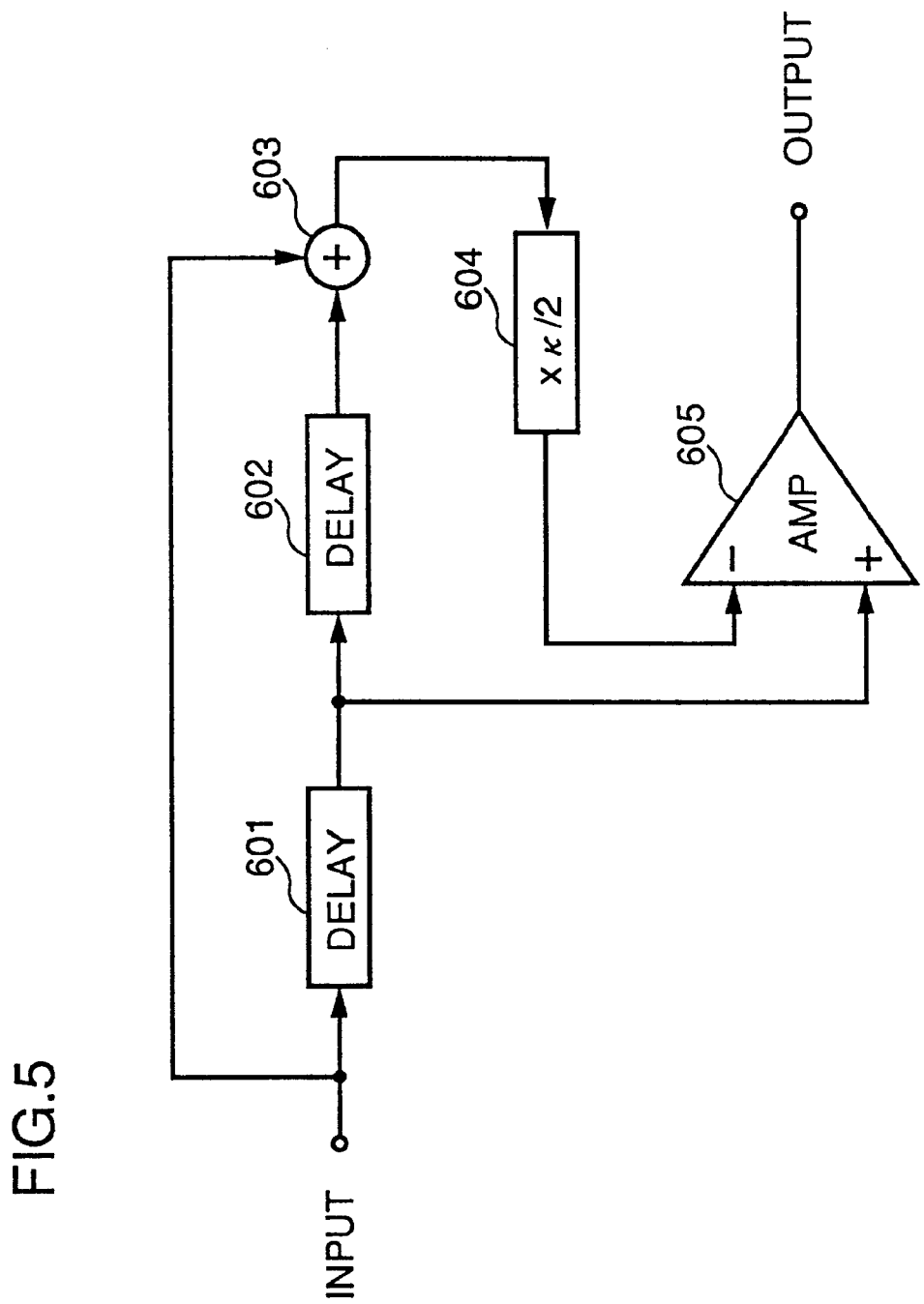
FIG. 5 is a block diagram showing a structure of a waveform equalization circuit of FIG. 4.

A transversal filter forming waveform equalization circuit 6 includes delay circuits 601 and 602, an adder circuit 603, a factor circuit 604, and a differential amplifier 605, as shown in FIG. 5. The signal from amplifier 5 shown in FIG. 4 is reduced in level as the pit length becomes smaller. More specifically, a signal having a high frequency is reduced in level. The transversal filter shown in FIG. 5 raises the level of such a signal having a high frequency to equalize the level of the signal over the entire frequency. The frequency of the signal that is to have the level raised can be adjusted by appropriately setting the delay amount of delay circuits 601 and 602, and the factor k of factor circuit 604.

In the above embodiment, a CD-ROM is taken as an example. However, the present invention is applicable to other standardized optical disks.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk, including a track having a track pitch of approximately 1.1–1.3 $\mu$m and shortest pit length of 0.54–0.63 $\mu$m.

2. The optical disk according to claim 1, having a recording density approximately two times the recording density of a compact disk format.

3. The optical disk according to claim 2, wherein said track pitch is approximately 1.2 $\mu$m.

\* \* \* \* \*